(12) United States Patent
Zhou et al.

(10) Patent No.: US 8,572,918 B1
(45) Date of Patent: Nov. 5, 2013

(54) EXTERNAL INSULATED WALL PROVIDED WITH REINFORCED POLYSTYRENE LAMINATE ANCHORED BY MECHANICAL FIXING DEVICE

(75) Inventors: Jinlie Zhou, Shanghai (CN); Yue Zhou, Shanghai (CN)

(73) Assignee: Shanghai One Gold Energy-Saving Technology Co., Ltd., Shanghai (CN)

( * ) Notice: Subject to any disclaimer, the term of this patent is extended or adjusted under 35 U.S.C. 154(b) by 0 days.

(21) Appl. No.: 13/814,500

(22) PCT Filed: Sep. 21, 2010

(86) PCT No.: PCT/CN2010/077188
§ 371 (c)(1),
(2), (4) Date: Feb. 5, 2013

(87) PCT Pub. No.: WO2011/038654
PCT Pub. Date: Apr. 7, 2011

(30) Foreign Application Priority Data

Sep. 29, 2009 (CN) .................... 2009 2 0210333 U
Apr. 26, 2010 (CN) .................... 2010 1 0154842
May 27, 2010 (CN) .................... 2010 1 0186231

(51) Int. Cl.
*E04B 1/74* (2006.01)
*E04B 1/62* (2006.01)

(52) U.S. Cl.
USPC ....................... 52/407.4; 52/506.05

(58) Field of Classification Search
USPC ............... 52/309.7, 404.2, 407.4, 408, 506.05
See application file for complete search history.

(56) References Cited

U.S. PATENT DOCUMENTS

| | | | |
|---|---|---|---|
| 2,889,698 A * | 6/1959 | Stevens | 52/410 |
| 4,646,498 A * | 3/1987 | Schneller et al. | 52/309.12 |
| 4,719,723 A * | 1/1988 | Van Wagoner | 52/15 |
| 4,841,705 A * | 6/1989 | Fuhrer | 52/410 |
| 4,875,322 A * | 10/1989 | Rozzi | 52/746.1 |
| 4,947,600 A * | 8/1990 | Porter | 52/235 |
| 4,996,812 A * | 3/1991 | Venable | 52/408 |
| 5,031,374 A * | 7/1991 | Batch et al. | 52/410 |
| 5,098,059 A * | 3/1992 | Sawyer | 249/16 |
| 5,224,316 A * | 7/1993 | Fredericks et al. | 52/309.7 |
| 5,699,644 A * | 12/1997 | Smith | 52/801.1 |
| 5,768,841 A * | 6/1998 | Swartz et al. | 52/281 |
| 6,581,348 B2 * | 6/2003 | Hunter, Jr. | 52/408 |
| 6,725,616 B1 * | 4/2004 | Pease | 52/309.7 |
| 6,863,970 B2 * | 3/2005 | Novak | 428/309.9 |
| 7,581,365 B2 * | 9/2009 | White et al. | 52/745.21 |
| 7,694,480 B2 * | 4/2010 | Niese et al. | 52/403.1 |
| 8,215,083 B2 * | 7/2012 | Toas et al. | 52/748.1 |
| 8,397,457 B2 * | 3/2013 | Hauser | 52/344 |
| 8,479,468 B1 * | 7/2013 | Abbasi | 52/408 |
| 2003/0070379 A1 * | 4/2003 | Worley | 52/506.05 |
| 2004/0050004 A1 * | 3/2004 | McCann | 52/404.2 |

* cited by examiner

FOREIGN PATENT DOCUMENTS

JP 03260246 A * 11/1991 .............. E04C 2/04

*Primary Examiner* — Christine T Cajilig

(57) ABSTRACT

An external insulation wall provided with a reinforced polystyrene laminate anchored by a mechanical fixing device is provided. A leveling binder layer (2) applied on a basic layer wall (1) is used as a binder layer, and a reinforced polystyrene laminate (3) is applied before the leveling binder layer (2) is dried. The reinforced polystyrene laminate (3) is directly fixed on the basic layer wall (1) by plastic expansion anchor bolts (4) through holes drilled on a surface of the reinforced polystyrene laminate (3). A standard tension load limit of an external thermal insulation system is increased by the reinforced polystyrene laminate with efficient help of the plastic expansion anchor bolts (4). Therefore, the external insulating wall provided with a reinforced polystyrene laminate anchored by a mechanical fixing device is especially suitable for external thermal insulation energy saving engineering on conventional building walls.

6 Claims, 1 Drawing Sheet

US 8,572,918 B1

EXTERNAL INSULATED WALL PROVIDED WITH REINFORCED POLYSTYRENE LAMINATE ANCHORED BY MECHANICAL FIXING DEVICE

CROSS REFERENCE OF RELATED APPLICATION

This is a U.S. National Stage under 35 U.S.C 371 of the International Application PCT/CN2010/077188, filed Sep. 21, 2010, which claims priority under 35 U.S.C. 119(a-d) to CN 200920210333.1, filed Sep. 29, 2009; CN 201010154842.4, filed Apr. 26, 2010; CN 201010186231.8, filed May 27, 2010.

BACKGROUND OF THE PRESENT INVENTION

1. Field of Invention

The present invention relates to an external insulating wall provided with a reinforced polystyrene laminate anchored by a mechanical fixing device, the external insulating wall is especially suitable for external thermal insulation energy saving engineering on conventional building walls.

2. Description of Related Arts

A conventional external insulating wall provided with polystyrene laminate is a composite wall formed by a basic layer wall and a polystyrene laminate. In such structure, adhesive is required to take on all the loads on the external insulating system, and then the loads are transmitted to the basic layer wall through a leveling binder layer. But there will be a potential danger about quality, safety and stability in the external insulating wall due to the incompletely gluing caused by unflatness of the basic layer wall or the insulating laminate. Additionally, when modifying external thermal insulation and processing energy saving engineering on conventional building walls, various degrees of disadvantages that the partial structure of the original basic layer wall is porous, hollowed and cracked as well as the disadvantages of surface pollutant and isolation layer will directly influence the stability and using safety of the new-glued external insulating layer. Thus, methods for fixing the polystyrene laminate need an improvement.

SUMMARY OF THE PRESENT INVENTION

An object of the present invention is to overcome shortcomings of incompletely gluing and hollowing of an external insulating wall provided with polystyrene laminate mounted by gluing, the present invention provides an external insulating wall provided with a reinforced polystyrene laminate anchored by a mechanical fixing device, which is capable of solving a problem that incompletely gluing created in mounting process by gluing is difficult to be determined and fixed, as well as enhancing and stabling an decorating layer of an original basic layer; in addition, a construction process thereof is easy and convenient.

Accordingly, in order to accomplish the above objects, the present invention provides a method comprising steps of: applying polymer mortar on a surface of a basic layer wall for serving as a leveling binder layer; mounting the reinforced polystyrene laminate with a two-dimensional grid reinforcer disposed under a surface layer thereof on the basic layer wall at the same time for forming a thermal insulation layer without gap so as to ensure that the reinforced polystyrene laminate is flat, wherein the reinforced polystyrene laminate is a man-made fiber grid reinforced polystyrene laminate, a glass fiber grid reinforced polystyrene laminate or a metal grid reinforced polystyrene laminate; drilling holes on a surface of the reinforced polystyrene laminate and mounting the reinforced polystyrene laminate on the basic layer wall with plastic expansion anchor bolts; applying a thin surface protecting layer of anti-crack mortar and rolling painting a layer of flexible decorating layer paint on the reinforced polystyrene laminate.

The leveling binder layer polymer mortar is 3~9 mm in thickness for satisfying a requirement of leveling and gluing thickness.

A distance between the plastic expansion anchor bolts provided evenly, which are mechanical fixing devices, for mounting the man-made fiber grid reinforced polystyrene laminate mentioned above is 250~450×250~450 mm, optimally 300~400×300~400 mm, a number of the plastic expansion anchor bolts is 8~9 per square meter.

A distance between the plastic expansion anchor bolts provided evenly, which are mechanical fixing devices, for mounting the glass fiber grid reinforced polystyrene laminate mentioned above is 200~450×200~450 mm, optimally 250~400×250~400 mm, the number of the plastic expansion anchor bolts is no less than 8 per square meter.

A distance between the plastic expansion anchor bolts provided evenly, which are mechanical fixing devices, for mounting the metal fiber grid reinforced polystyrene laminate mentioned above is 200~450×200~450 mm, optimally 300~400×300~400 mm, the number of the plastic expansion anchor bolts is no less than 8 per square meter.

An equivalent anchoring depth of the plastic expansion anchor bolts is no less than 25 mm, a standard tension load limit of each of the plastic expansion anchor bolt is no less than 0.6KN, a diameter of a plastic perforated plate mounted on a bottom portion of the plastic expansion anchor bolt is no less than 60 mm for ensuring stability of the external thermal insulation layer.

Therefore, the present invention reinforced polystyrene laminate has the advantages as follows: compared with a conventional external insulating wall provided with polystyrene laminate mounted by gluing, according to the present invention, leveling and assisting gluing of the thermal insulation layer with the reinforced polystyrene laminate is done in one process for decreasing construction procedures and time; the construction process of the reinforced polystyrene laminate anchored by a mechanical fixing device is easy, the operation thereof is convenient, and the construction quality can be controlled easily; the reinforced polystyrene laminate greatly enhances a rupture strength of the decorating layer and stabilizes the decorating layer with assistance of the anchor bolts. The present invention is especially suitable for external thermal insulation energy saving engineering on conventional building walls and is capable of solving a problem that gluing strength does not meet requirement because of flaking, cracking and polluted decorating layer of the original basic layer as well as enhances and protects the decorating layer of the original basic layer for increasing stability thereof.

These and other objectives, features, and advantages of the present invention will become apparent from the following detailed description, the accompanying drawings, and the appended claims.

BRIEF DESCRIPTION OF THE DRAWINGS

Specific characteristics and properties of the present invention are further illustrated by preferred embodiments and drawings according to the preferred embodiments as follows.

Reference numbers of elements: 1—basic layer wall, 2—leveling binder layer, 3—reinforced polystyrene laminate, 4—plastic expansion anchor bolt, 5—thin surface protecting layer, 6—decorating layer.

DETAILED DESCRIPTION OF THE PREFERRED EMBODIMENT

Figure 1:
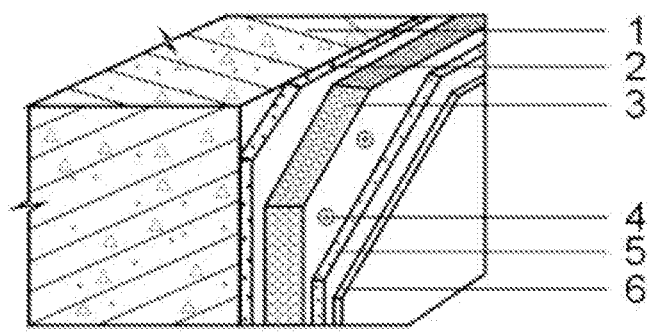
FIG. 1 is a structure sketch view of according to a preferred embodiment of the present invention.

Referring to FIG. 1 of the drawings, according to a preferred embodiment of the present invention is illustrated, wherein an external thermal insulation wall comprises a basic layer wall 1, a leveling binder layer 2, a reinforced polystyrene laminate 3, plastic expansion anchor bolts 4, a thin surface protecting layer 5 and an decorating layer 6 from inside to outside, wherein the basic layer wall 1 can be a concrete wall, an aerated concrete block wall, a solid brick wall, a hollow brick wall or a light-weight cement wall, the reinforced polystyrene laminate 3 is made of a polystyrene laminate and grid reinforcer disposed under a surface layer thereof, the reinforced polystyrene laminate 3 can be an expanded polystyrene(EPS) laminate or an extruded polystyrene(XPS) laminate, the grid reinforcer can be made of man-made fiber grid, glass fiber grid or metal grid, the grid reinforcer can be applied on one side or both side, the plastic expansion anchor bolts 4 can be pile anchor bolts or screw anchor bolts, a plastic casing tube and a plastic perforated plate can be made of polyamide, polythene or polypropylene, the thin surface protecting layer 5 is made of anti-crack layer mortar and alkali-resisting glass fiber grid, the decorating layer 6 is made of layer paint and coating paint.

Figure 2:
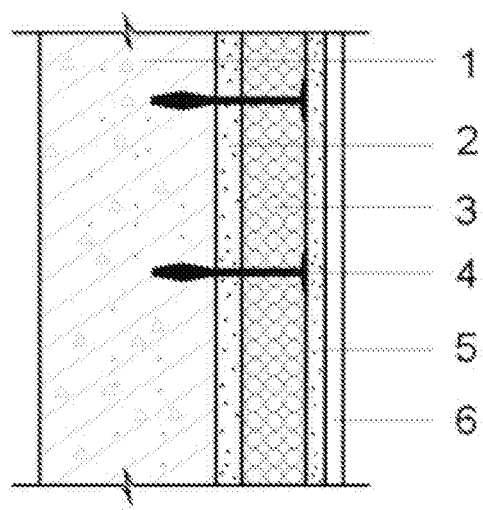
FIG. 2 is a longitudinal section structure sketch view of FIG. 1.

Referring to FIG. 2 of the drawings, polymer mortar on the leveling binder layer 2 is 3~9 mm in depth, the reinforced polystyrene laminate 3 should be glued right after applying the leveling binder layer 2, wherein the reinforced polystyrene laminate 3 is glued with a surface where the reinforcer is mounted set outwardly. Holes are drilled on a surface of the reinforced polystyrene laminate 3 and the reinforced polystyrene laminate 3 is mounted on the basic layer wall 1 by utilizing plastic expansion anchor bolts 4 after gluing strength of the leveling binder layer 2 becomes no less than 0.06 MPa, an equivalent anchoring depth of the plastic expansion anchor bolts 4 is no less than 25 mm, a diameter of the plastic perforated plate is no less than 60 mm, optimally 65~75 mm. Then applying the thin surface protecting layer 5 on the reinforced polystyrene laminate 3, wherein the reinforced polystyrene laminate 3 must be mounted by the plastic expansion anchor bolts 4 for protecting a thermal insulation layer; the thin surface protecting layer 5 is made of anti-crack layer mortar with alkali-resisting glass fiber grid provided inside for anti-cracking, water-proofing and shock resistance. The decorating layer 6 is applied on the thin surface protecting layer 5, construction processes comprising: applying flexible putty; applying flexible decorating layer paint and applying flexible coating paint.

Figure 3:
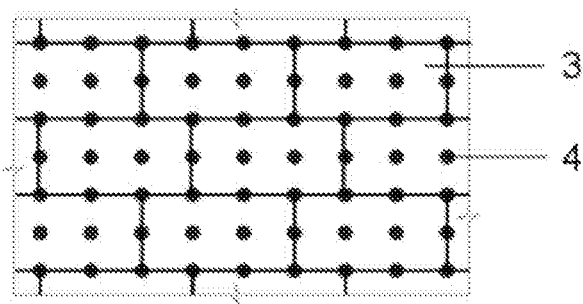
FIG. 3 is a front structure sketch view of a reinforced polystyrene laminate anchored by a mechanical fixing device.

Referring to FIG. 3 of the drawings, the reinforced polystyrene laminates 3 are arranged in a horizontal rectangle form, perpends of the reinforced polystyrene laminates 3 are in a running bond form, a distance between the perpends is optimally 400 mm or 600 mm in module for taking full advantage of anchoring effect of the plastic expansion anchor bolts 4 applied in the perpends. A man-made fiber grid reinforced polystyrene laminate 3 is 800~1600 mm in length, optimally 1200 mm, and 400~800 mm in width, optimally 600 mm. A glass fiber or a metal grid reinforced polystyrene laminate 3 is 800~2400 mm in length, optimally 900~1600 mm, and 400~1600 mm in width, optimally 600~1200 mm.

The plastic expansion anchor bolts 4 are applied in the reinforced polystyrene laminate 3 as well as the perpends, A distance between the plastic expansion anchor bolts 4 for mounting the man-made fiber grid reinforced polystyrene laminate 3 in horizontal and vertical directions is 250~450× 250~450 mm, optimally 300~400×300~400 mm, a distance between the plastic expansion anchor bolts 4 for mounting the glass fiber grid reinforced polystyrene laminate 3 in horizontal and vertical directions is 200~450×200~450 mm, optimally 250~400×250~400 mm, a distance between the plastic expansion anchor bolts 4 for mounting the metal fiber grid reinforced polystyrene laminate 3 in horizontal and vertical directions is 200~450×200~450 mm, optimally 300~400× 300~400 mm, a number of the plastic expansion anchor bolts 4 applied in each of the perpends is no less than 3 with a distance of no more than 400 mm, the plastic expansion anchor bolts 4 should be applied in every edge and corner of the reinforced polystyrene laminate 3 for ensuring stability thereof.

One skilled in the art will understand that the embodiment of the present invention as shown in the drawings and described above is exemplary only and not intended to be limiting.

It will thus be seen that the objects of the present invention have been fully and effectively accomplished. Its embodiments have been shown and described for the purposes of illustrating the functional and structural principles of the present invention and is subject to change without departure from such principles. Therefore, this invention includes all modifications encompassed within the spirit and scope of the following claims.

What is claimed is:

1. An external insulating wall provided with a polystyrene laminate with a metal grid reinforcer anchored by a mechanical fixing device, comprising: a leveling binder layer applied on a base layer wall, reinforced polystyrene laminates applied on said leveling binder layer, a plurality of plastic expansion anchor bolts applied in said reinforced polystyrene laminate, a thin surface protecting layer applied on said reinforced polystyrene laminate and a decorating layer applied on said thin surface protecting layer, wherein puttying polymer mortar is applied on the base layer wall by 3-9 mm in thickness for forming said leveling binder layer, said leveling binder layer on the base layer wall is once-shaped for ensuring that said reinforced polystyrene laminate is flat, said reinforced polystyrene laminate with a two-dimensional metal grid reinforcer disposed under a surface layer thereof is mounted on the base layer wall at the same time for forming a thermal insulation layer without void, a side with reinforcer of said reinforced polystyrene is set outwardly, said reinforced polystyrene laminates are arranged in a horizontal rectangle form, perpends of said reinforced polystyrene laminates are in a running bond form, a distance between said perpends is optimally 400 mm or 600 mm in module for taking full advantage of anchoring effect of said plastic expansion anchor bolts applied in said perpends; said reinforced polystyrene laminate is directly fixed on the base layer wall by said plastic expansion anchor bolts through holes drilled on a surface of said reinforced polystyrene laminate, a tension load limit and stability of an external thermal insulation system is increased and a problem that gluing strength does not meet requirement because of flaking, cracking and polluted decorating layer of the base layer is solved by said reinforced polystyrene laminate with efficient help of said plastic expansion anchor bolts, in addition, the base layer wall is enhanced and protected for increasing stability; the metal grid reinforcer formed by electric welding decussations of longitudinal steel wires and transverse steel wires is disposed under a surface layer of said reinforced polystyrene laminate with metal grid reinforcer, said reinforced polystyrene laminate with metal grid reinforcer is 800-2400 mm in length and 400-1600 mm in width; a distance between said plastic expansion anchor bolts in horizontal and vertical directions is 200-450×200-450 mm, a number of said plastic expansion anchor bolts is no less than 8 per square meter, a number of said plastic expansion anchor bolts applied in each of the perpends is no less than 3 with a distance of no more than 400 mm, said plastic expansion anchor bolts should be applied in every edge and corner of said reinforced polystyrene laminate for ensuring stability thereof; the base layer wall is a concrete wall, an aerated concrete block wall, a solid brick wall, a hollow brick wall or a light-weight cement wall.

2. The external insulating wall provided with a polystyrene laminate with a metal grid reinforcer anchored by a mechanical fixing device, as recited in claim 1, wherein said reinforced polystyrene laminate with metal grid reinforcer is optimally 900~1600 mm in length, and optimally 600~1200 mm in width, said distance between said plastic expansion anchor bolts is optimally 300~400×300~400 mm.

3. An external insulating wall provided with a polystyrene laminate with a glass fiber grid reinforcer anchored by a mechanical fixing device, comprising: a leveling binder layer applied on a base layer wall, reinforced polystyrene laminates applied on said leveling binder layer, a plurality of plastic expansion anchor bolts applied in said reinforced polystyrene laminate, a thin surface protecting layer applied on said reinforced polystyrene laminate and a decorating layer applied on said thin surface protecting layer, wherein putting polymer mortar is applied on the base layer wall by 3-9 mm in thickness for forming said leveling binder layer, said leveling binder layer on the base layer wall is once-shaped for ensuring that said reinforced polystyrene laminate is flat, said reinforced polystyrene laminate with a two-dimensional glass fiber grid reinforcer disposed under a surface layer thereof is mounted on the base layer wall at the same time for forming a thermal insulation layer without void, a side with reinforcer of said reinforced polystyrene is set outwardly, said reinforced polystyrene laminates are arranged in a horizontal rectangle form, perpends of said reinforced polystyrene laminates are in a running bond form, a distance between said perpends is optimally 400 mm or 600 mm in module for taking full advantage of anchoring effect of said plastic expansion anchor bolts applied in said perpends; said reinforced polystyrene laminate is directly fixed on the base layer wall by said plastic expansion anchor bolts through holes drilled on a surface of said reinforced polystyrene laminate, a tension load limit and stability of an external thermal insulation system is increased and a problem that gluing strength does not meet requirement because of flaking, cracking and polluted decorating layer of the base layer is solved by said reinforced polystyrene laminate with efficient help of said plastic expansion anchor bolts, in addition, the base layer wall is enhanced and protected for increasing stability; said glass fiber grid reinforcer formed by knitting decussations of glass fiber warps and wefts is disposed under a surface layer of said reinforced polystyrene laminate with glass fiber grid reinforcer, said reinforced polystyrene laminate is 800-2400 mm in length and 400-1600 mm in width; a distance between said plastic expansion anchor bolts in horizontal and vertical directions is 200-450×200-450 mm, a number of said plastic expansion anchor bolts is no less than 8 per square meter, a number of said plastic expansion anchor bolts applied in each of the perpends is no less than 3 with a distance of no more than 400 mm, said plastic expansion anchor bolts should be applied in every edge and corner of said reinforced polystyrene laminate for ensuring stability thereof; the base layer wall is a concrete wall, an aerated concrete block wall, a solid brick wall, a hollow brick wall or a lightweight cement wall.

4. The external insulating wall provided with a polystyrene laminate with a glass fiber grid reinforcer anchored by a mechanical fixing device, as recited in claim 3, wherein said reinforced polystyrene laminate with glass fiber grid reinforcer is optimally 900~1600 mm in length, and optimally 600~1200 mm in width, said distance between said plastic expansion anchor bolts is optimally 250~400×250~400 mm.

5. An external insulating wall provided with a polystyrene laminate with a man-made fiber grid reinforcer anchored by a mechanical fixing device, comprising: a leveling binder layer applied on a base layer wall, reinforced polystyrene laminates applied on said leveling binder layer, a plurality of plastic expansion anchor bolts applied in said reinforced polystyrene laminate, a thin surface protecting layer applied on said reinforced polystyrene laminate and a decorating layer applied on said thin surface protecting layer, wherein putting polymer mortar is applied on the base layer wall by 3-9 mm in thickness for forming said leveling binder layer, said leveling binder layer on the base layer wall is once-shaped for ensuring that said reinforced polystyrene laminate is flat, said reinforced polystyrene laminate with a two-dimensional man-made fiber grid reinforcer disposed under a surface layer thereof is mounted on the base layer wall at the same time for forming a thermal insulation layer without void, a side with reinforcer of said reinforced polystyrene is set outwardly, said reinforced polystyrene laminates are arranged in a horizontal rectangle form, perpends of said reinforced polystyrene laminates are in a running bond form, a distance between said perpends is optimally 400 mm or 600 mm in module for taking full advantage of anchoring effect of said plastic expansion anchor bolts applied in said perpends; said reinforced polystyrene laminate is directly fixed on the base layer wall by said plastic expansion anchor bolts through holes drilled on a surface of said reinforced polystyrene laminate, a tension load limit and stability of an external thermal insulation system is increased and a problem that gluing strength does not meet requirement because of flaking, cracking and polluted decorating layer of the base layer is solved by said reinforced polystyrene laminate with efficient help of said plastic expansion anchor bolts, in addition, the base layer wall is enhanced and protected for increasing stability; the man-made fiber grid reinforcer formed by two-dimensional man-made fiber is disposed under a surface layer of said reinforced polystyrene laminate with man-made fiber grid reinforcer, said reinforced polystyrene laminate is 800-1600 mm in length and 400-800 mm in width; a distance between said plastic expansion anchor bolts in horizontal and vertical directions is 250-450×250-450 mm, a number of said plastic expansion anchor bolts is no less than 8 per square meter, a number of said plastic expansion anchor bolts applied in each of the perpends is no less than 3 with a distance of no more than 400 mm, said plastic expansion anchor bolts should be applied in every edge and corner of said reinforced polystyrene laminate for ensuring stability thereof; the base layer wall is a concrete wall, an aerated concrete block wall, a solid brick wall, a hollow brick wall or a light-weight cement wall.

6. The external insulating wall provided with a polystyrene laminate with a man-made fiber grid reinforcer anchored by a mechanical fixing device, as recited in claim 5, wherein said reinforced polystyrene laminate with man-made fiber grid reinforcer is optimally 1200 mm in length, and optimally 600 mm in width, said distance between said plastic expansion anchor bolts is optimally 300~400×300~400 mm.

\* \* \* \* \*